United States Patent
Cheng et al.

(10) Patent No.: US 6,270,330 B1
(45) Date of Patent: Aug. 7, 2001

(54) WASTE FOAMED POLYSTYRENE MATERIAL RECLAIMING SYSTEM

(76) Inventors: Shao-Szu Cheng; Tung-Han Liu, both of PO Box 82-144, Taipei (TW)

(*) Notice: Subject to any disclaimer, the term of this patent is extended or adjusted under 35 U.S.C. 154(b) by 0 days.

(21) Appl. No.: 09/611,267

(22) Filed: Jul. 6, 2000

(51) Int. Cl.⁷ .................................................. C08J 11/04
(52) U.S. Cl. ............................ 425/86; 425/289; 425/383
(58) Field of Search .................................. 264/916, 920, 264/37.13, 148; 521/47; 422/280, 281; 425/84, 86, 289, 383

(56) References Cited

U.S. PATENT DOCUMENTS

| | | | |
|---|---|---|---|
| 3,607,999 | * 9/1971 | Corbett et al. | 264/916 |
| 3,723,582 | * 3/1973 | Winstead | 264/37.13 |
| 3,795,633 | * 3/1974 | Golovoy et al. | 264/916 |
| 3,857,799 | * 12/1974 | Ooba et al. | 521/46 |
| 3,859,404 | * 1/1975 | Immel et al. | 264/916 |
| 3,933,989 | * 1/1976 | Itoh et al. | 521/46 |
| 4,164,484 | * 8/1979 | Tokuda et al. | 521/47 |
| 4,254,068 | * 3/1981 | Otsuka | 264/916 |
| 4,517,312 | * 5/1985 | Kumasaka et al. | 521/47 |
| 5,061,735 | * 10/1991 | Zielinski | 521/47 |
| 5,169,588 | * 12/1992 | Estepp | 264/916 |
| 5,198,471 | * 3/1993 | Nauman et al. | 521/47 |
| 5,225,130 | * 7/1993 | Deiringer | 264/102 |
| 5,269,948 | * 12/1993 | Krutchen | 521/47 |
| 5,385,950 | * 1/1995 | Mahler | 521/47 |
| 5,629,352 | * 5/1997 | Shiino et al. | 521/47 |
| 5,824,709 | * 10/1998 | Suka | 521/47 |
| 5,891,403 | * 4/1999 | Badger et al. | 521/47 |
| 5,922,835 | * 7/1999 | Van Den Wittenboer | 521/47 |
| 5,935,536 | * 8/1999 | Badger et al. | 422/281 |

* cited by examiner

*Primary Examiner*—Allan R. Kuhns
(74) *Attorney, Agent, or Firm*—A & J

(57) ABSTRACT

A waste foamed polystyrene material reclaiming method includes the steps of waste material crushing, solvent mixing, filtering, secondary mixing, distilling, evaporated solvent condensing and recycling, reclaimed polystyrene material heating, reclaimed polystyrene material extruding, extruded mass of reclaimed polystyrene material cooling, and grain-cutting.

1 Claim, 1 Drawing Sheet

WASTE FOAMED POLYSTYRENE MATERIAL RECLAIMING SYSTEM

BACKGROUND OF THE INVENTION

The present invention relates to a method of reclaiming waste foamed polystyrene material. The invention relates also to a system for automatically reclaiming waste foamed polystyrene material.

Polystyrene material has been intensively used for making foamed products (dishes, lunchboxes, buffer materials for packing, and etc.) for the advantage of low cost. However, because waste foamed polystyrene material is bulky and not self-decomposable under the weather, it is difficult to properly dispose of waste foamed polystyrene material, and the cost of disposing of waste foamed polystyrene material is high. Further, directly burning waste foamed polystyrene material produces toxic gas. Therefore, there is a strong demand for an economic, efficient waste foamed polystyrene material reclaiming system.

SUMMARY OF THE INVENTION

The present invention has been accomplished under the circumstances in view. It is the main object of the present invention to provide a waste foamed polystyrene material reclaiming method, which is practical to automatically reclaim waste foamed polystyrene material. It is another object of the present invention to provide a waste foamed polystyrene material reclaiming system, which is practical to automatically reclaim waste foamed polystyrene material. It is another object of the present invention to provide a waste foamed polystyrene material reclaiming system, which is economic, and does not pollute the environment during its operation. According to the present invention, waste foamed polystyrene material is crushed and mixed with a solvent to form a paste-like material. The paste-like material is then distilled into evaporated solvent and reclaimed polystyrene material. The evaporated solvent is then condensed into liquid state solvent for recycling. The reclaimed polystyrene material is then extruded into a mass of reclaimed polystyrene material, and then cold down in a water tank, and then cut into grained-like reclaimed polystyrene material.

DETAILED DESCRIPTION OF THE PREFERRED EMBODIMENT

Figure 1:
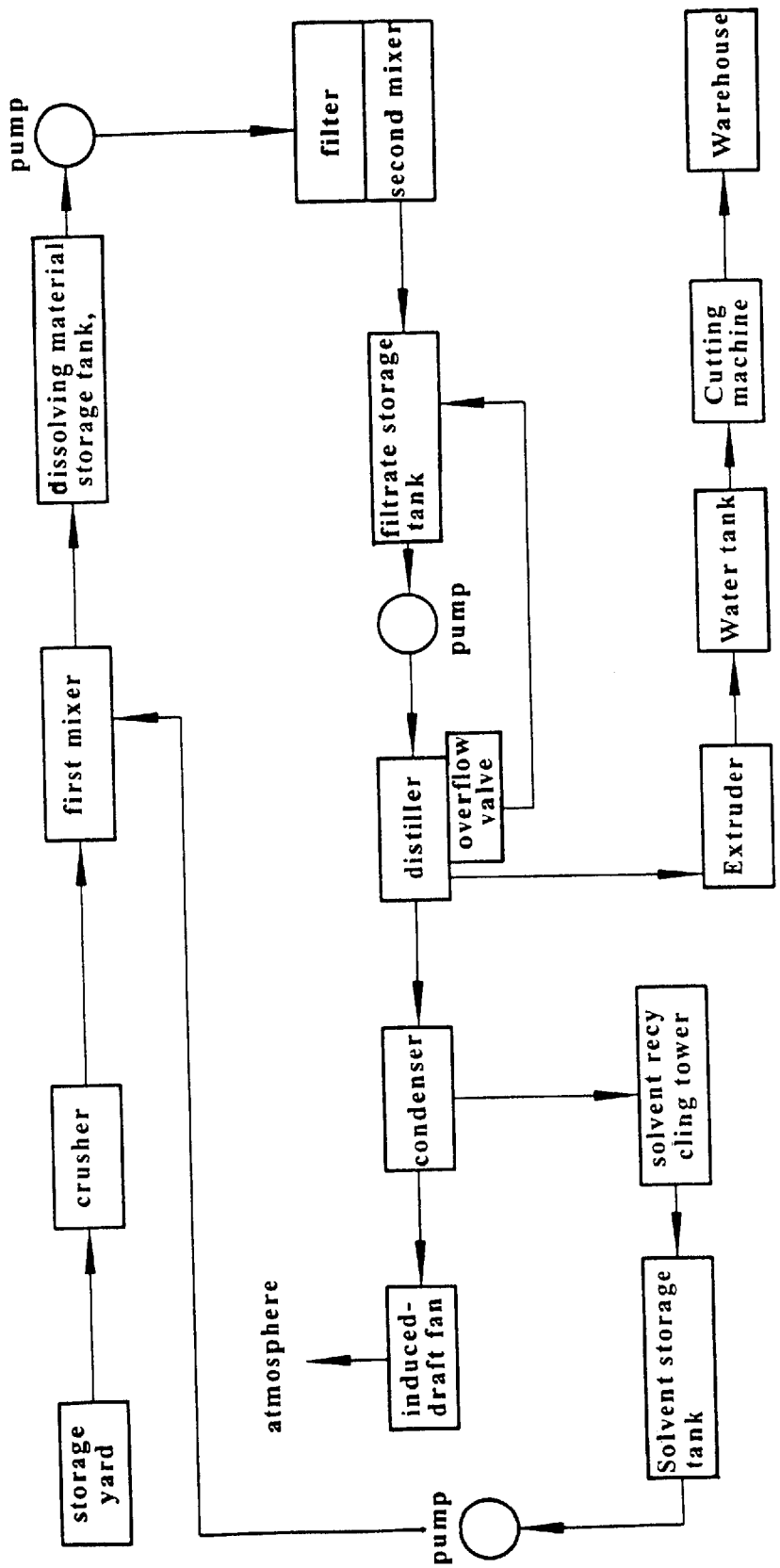
FIG. 1 is a system block diagram showing a waste foamed polystyrene material reclaiming system according to the present invention.

A waste foamed polystyrene material reclaiming method in accordance with the present invention comprises the steps of:

a. crushing waste foamed polystyrene material;
b. adding a solvent to the crushed waste foamed polystyrene material at the ratio of two parts of solvent with one part of crushed waste foamed polystyrene material, and then mixing the solvent and the crushed waste foamed polystyrene material into a paste-like material;
c. filtering the paste-like material obtained from step (b) with a filter;
d. putting the filtrate thus obtained from step (c) in a container and then heating the filtrate in the container to about 120° C.~160° C., enabling the filtrate to be separated into reclaimed polystyrene material and evaporated solvent, and then condensing the evaporated solvent into liquid state solvent for recycling and guiding the reclaimed polystyrene material out of the container;
e. heating the reclaimed polystyrene material thus obtained from step (d) to about 160° C.~200° ;
f. extruding the reclaimed polystyrene material thus obtained from step (e) into a mass of reclaimed polystyrene material subject to the desired shape and then cooling down the mass of reclaimed polystyrene material; and
g. cutting the mass of reclaimed polystyrene material into grained polystyrene material.

Referring to FIG. 1, waste foamed polystyrene material is washed and then stored in a storage yard. Well-washed waste foamed polystyrene material is then delivered from the storage yard to a crusher by a conveyer, and then crushed into crushed waste foamed polystyrene material. Crushed waste foamed polystyrene material is than delivered to a first mixer, and at the same time a solvent is pumped from a solvent storage tank to the first mixer for mixing with the crushed waste foamed polystyrene material in the first mixer to form a paste-like material. The solvent is mixed with the crushed waste foamed polystyrene material at the ratio of 2:1. The paste-like material is than delivered from the first mixer to a dissolving material storage tank, and then pumped by a pump from the dissolving material storage tank to a second mixer through a filter. After having been well mixed in the second mixer, the well-mixed filtrate is delivered to a storage tank, and then pumped from the storage tank to a distiller by a pump. The distiller has a return valve connected to the storage tank for enabling overflow filtrate to be returned to the storage tank. The filtrate left in the distiller is distilled and separated into evaporated solvent and reclaimed polystyrene material. The evaporated solvent is then guided from the distiller to a condenser, and then condensed into a liquid state solvent. The liquid state solvent is then collected by a solvent recycling tower, and then delivered to the solvent storage tank. At the same time, waste gas is drawn out of the distiller into the atmosphere by an induced-draft fan. The reclaimed polystyrene material is then extruded into a mass of soft polystyrene material through an extruder, and then directly delivered from the extruder to a water tank for cooling. After cooling, the hardened reclaimed polystyrene material is then cut into grained-like reclaimed polystyrene material and stored in a warehouse.

While only one embodiment of the present invention has been shown and described, it will be understood that various modifications and changes could be made thereunto without departing from the spirit and scope of the invention disclosed.

What the invention claimed is:

1. A waste foamed polystyrene material reclaiming system comprising:

a crusher adapted to crush washed foamed polystyrene material crushed waste foamed polystyrene material;

a solvent storage tank holding a solvent;

a first mixer adapted to mix the solvent from said solvent storage tank with the crushed waste foamed polystyrene material from said crusher into a paste-like material;

a dissolving material storage tank connected to said first mixer and adapted to store the paste-like material obtained from said first mixer;

a filter connected to said dissolving material storage tank and adapted to filter the paste-like material;

a second mixer connected to said filter and adapted to mix the filtrate obtained through said filter;

a filtrate storage tank adapted to store the well-mixed filtrate obtained from said second mixer;

a distiller connected to said filtrate storage tank and adapted to distill said well-mixed filtrate into evaporated solvent and reclaimed polystyrene material;

an overflow valve connected between said distiller and said filtrate storage tank for enabling overflow of well mixed filtrate to be returned to said filtrate storage tank;

a condenser connected to said overflow valve and adapted to condense said evaporated solvent into a liquid state solvent;

a solvent recycling tower connected between said condenser and said solvent storage tank;

an induced-draft fan adapted to draw waste gas from said distiller into the atmosphere;

an extruder connected to said distiller and adapted to extrude said reclaimed polystyrene material into a mass of soft polystyrene material;

a water tank connected to said extruder and adapted to cool down said mass of soft polystyrene material with water; and a cutting machine adapted to cut hardened mass of soft polystyrene material obtained from said water tank into grained-like reclaimed polystyrene material.

* * * * *